United States Patent [19]

Neumann et al.

[11] Patent Number: 4,638,591
[45] Date of Patent: Jan. 27, 1987

[54] FISH SECURING DEVICE

[76] Inventors: David B. Neumann, P. O. Box 3194, Manhattan Beach, Calif. 90266; Robert D. Hunt, 4166 137th St., Hawthorne, Calif. 90250

[21] Appl. No.: 827,458

[22] Filed: Feb. 10, 1986

[51] Int. Cl.[4] .............................................. A01K 83/04
[52] U.S. Cl. .............................................. 43/89; 43/5; 43/34
[58] Field of Search .................................. 43/89, 5, 34

[56] References Cited

U.S. PATENT DOCUMENTS

| | | | |
|---|---|---|---|
| 733,118 | 7/1903 | Armstrong | 43/89 |
| 1,136,297 | 4/1915 | Thayer | 43/89 |
| 1,160,269 | 11/1915 | Durkee | 43/89 |
| 1,180,120 | 4/1916 | Evans | 43/89 |
| 1,334,702 | 3/1920 | Juras | 43/89 |
| 1,624,456 | 4/1927 | Young | 43/89 |
| 2,146,817 | 2/1939 | Grzybowski | 43/89 |
| 2,534,152 | 12/1950 | Van Arkel | 43/89 |
| 2,587,675 | 3/1952 | Airey | 43/89 |
| 2,616,212 | 11/1952 | Cornalba | 43/89 |
| 2,624,150 | 1/1953 | Jolley | 43/89 |
| 2,897,628 | 8/1959 | Thibodeau | 43/89 |

Primary Examiner—Gene P. Crosby
Attorney, Agent, or Firm—Bruce A. Jagger; Natan Epstein

[57] ABSTRACT

This fish securing device has a relatively small diameter cylindrical axial assembly to which are hinged a number of fish securing arms. A spring loading mechanism contained within the axial assembly urges the hinged arms towards a closed fish securing position by means of an actuating linkage arm associated with each securing arm. A cocking and trip mechanism is actuatable upon tugging on a fish lure connected to one end of the axial assembly for releasing the securing arms from an open cocked position towards their closed position to secure a fish tugging on the lure. The device features an improved, compact, streamlined configuration whereby the spring loading mechanism is contained within the central tubular assembly and wherein the cocking and trippng mechanism and securing arm actuating linkages are disposed in a relatively protected position between the securing arms and the central axial assembly to minimize the possibility of damage or of entanglement with underwater growth, rocks or debris.

11 Claims, 13 Drawing Figures

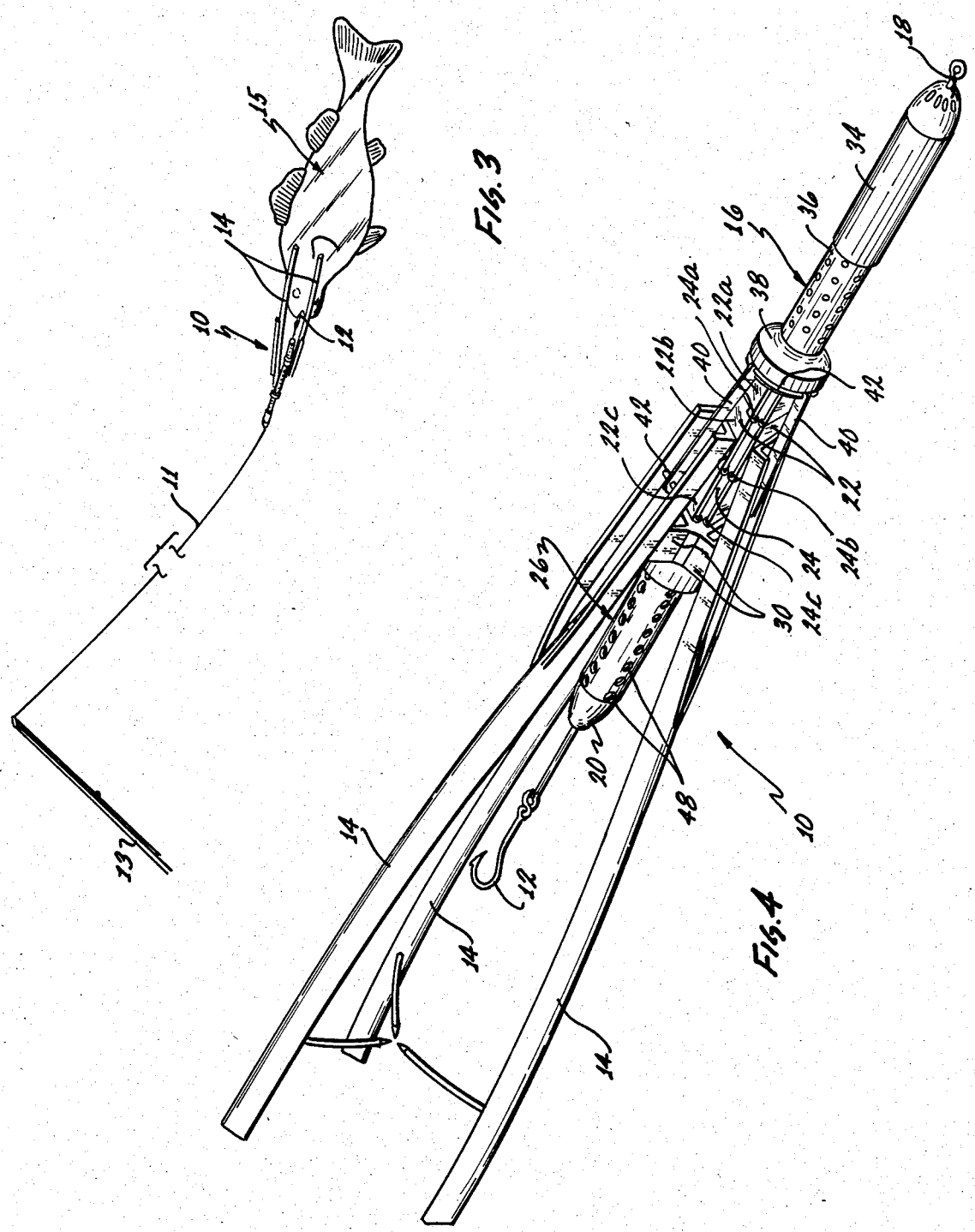

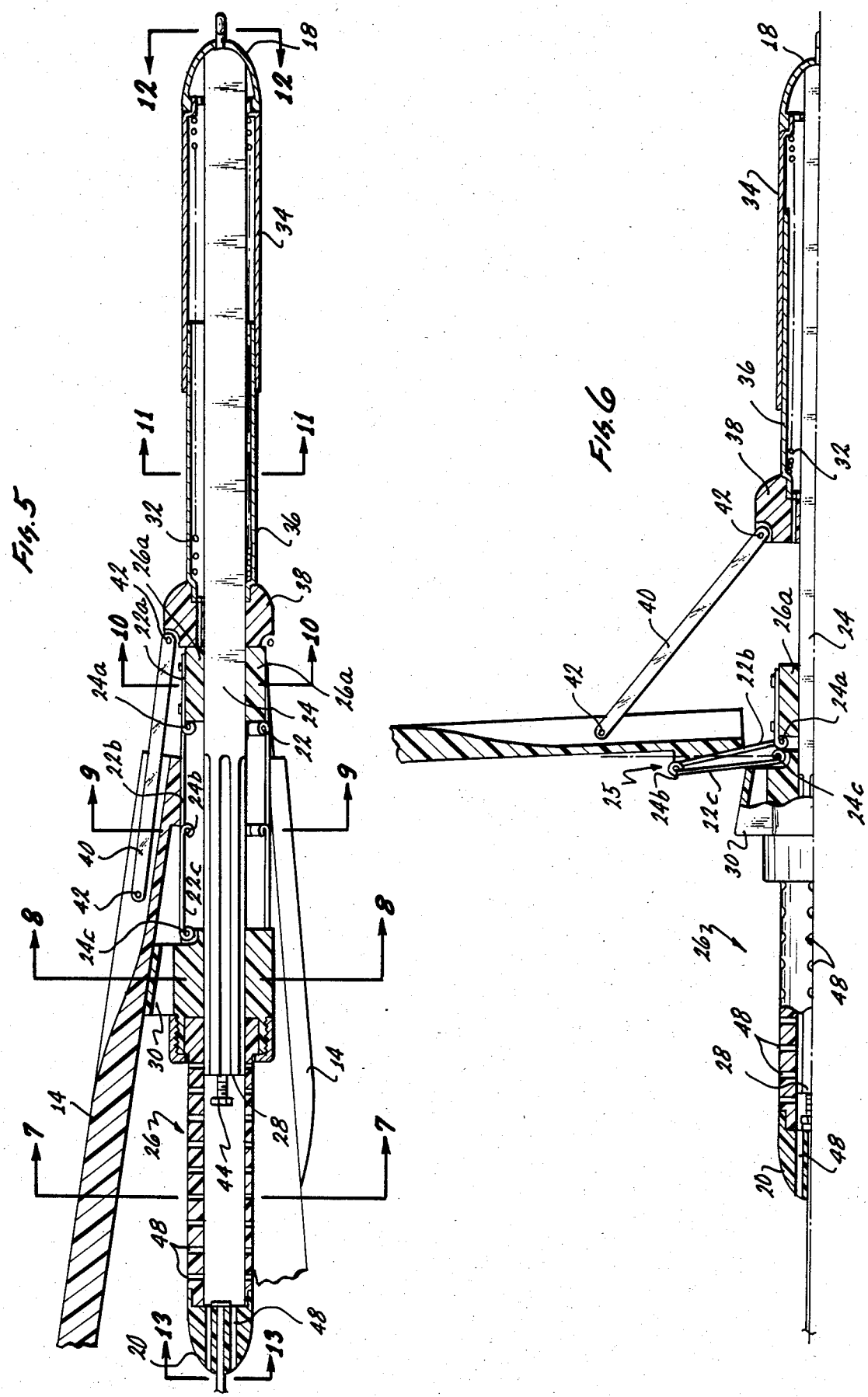

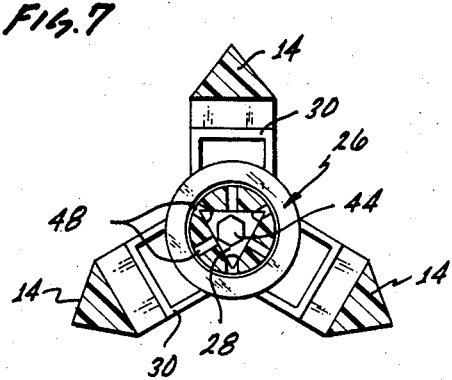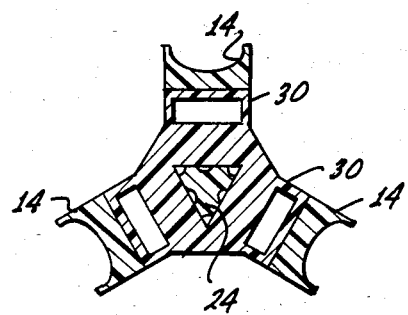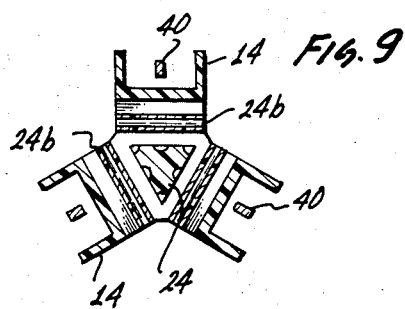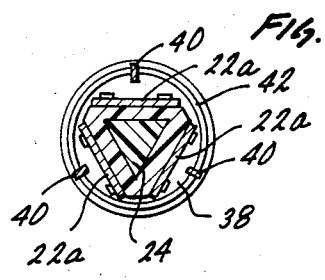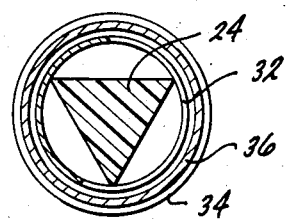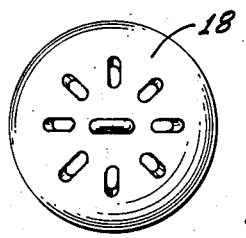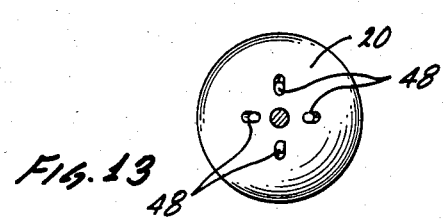

FISH SECURING DEVICE

BACKGROUND OF THE INVENTION

1. Field of the Invention

The present invention pertains generally to the field of fishing and angling equipment and is more particularly directed to an improved automatic fish securing device.

2. State of the Prior Art

Anglers are frequently frustrated by the loss of a fish which having been caught on a hook and line, frees itself because the hook failed to set securely and becomes disengaged in the struggle put up by the fish. Occasionally, the hook proves too small or weak for the size or strength of a particular fish and is torn out of the fish body by the resistance of the fish against the pull of the fishing line. On still other occasions, a weak or undersized hook may straighten out of its normal curved shape by the force of the fish which is then able to disengage itself from the hook. Such experiences have lead to efforts directed towards development of more effective securing device capable of grasping securely the body of a fish rather than relying only on a hook set in the mouth of the fish.

A considerable number of devices has been developed for such purposes and in general include two or more spear arms or large hooks hinged together at one end by means of a spring loaded mechanism which is cocked with the spear arms in an open position and tripped to a closed position by the tugging of a fish on a trip line to which is attached a conventional baited fish hook or fish lure. When so tripped, the spear arms or hooks pierce the body of the fish which is then caught and held between the closed spear arms.

The prior art devices differ from each other primarily in the design and mechanical operation of the spring loaded actuating mechanism. In general, these devices are manually set or cocked against the spring loading and each is provided with a trip mechanism which suddenly releases a cocking or latch mechanism so that the spear arms or body engaging hooks are released under spring loading for inward pivoting movement at their outer ends against the body of a fish tugging at a baited hook connected to the trip mechanism and positioned between the fish engaging spear arms or hooks.

Further improvement in such devices is desirable nonetheless so as to make a fish securing device suitable for casting by means of a rod and reel combination of conventional design such that the fish securing device can be cast, i.e. flung through the air to a fishing area distant from the fisherman in its cocked position without being tripped by the force exerted on the device during casting. It is further desirable to modify the spring loading and tripping mechanism for improved streamlined configuration so as to minimize the drag of the device in the water during recovery by means of the aforementioned rod and reel and so that it can be readily trolled behind a fishing vessel without excessive and damaging drag forces being imposed on the device. Still further, a continuing need exists for such a fish securing device, of sufficiently rugged and reliable construction and adapted to be effectively used on the bottom of the fishing area, to be sufficiently streamlined so as not to become ensnared in aquatic vegetation or rocks normally found on such bottom surfaces.

SUMMARY OF THE INVENTION

The present invention achieves a compact, streamlined configuration wherein a number of spear or hooked arms are hinged to a relatively small diameter cylindrical axial assembly containing the spring loading, cocking and trip mechanism. The axial assembly is attached to a fishing line at a proximal end and at its opposite or distal end is connected a fishing lure or hook to be baited so as to attract a fish thereto. The axial assembly comprises an axial guide member having a proximal end and a distal end, a plunger slideable along the axial guide member and a loading spring connected between the plunger and the axial guide so as to urge the plunger towards said distal end. The spear arms or hooks are hingedly mounted at their inner ends to the axial guide intermediate the plunger and the distal end of the axial guide member. Each spear arm is connected by an actuating linkage arm to the spring loaded plunger and the arms are thereby simultaneously pivotable between an open cocked position and a closed fish engaging position. Each spear arm is supported in its cocked position against the spring loading by an over-the-center locking hinge mounted at one end to the axial guide member and at its opposite end to a fish hook or lure carrier axially slideable on the guide member distally of the locking hinges. A fish hook or lure is connected to the distal end of the carrier such that when a pulling or tugging force is applied to the carrier tending to pull the carrier along the guide member in a distal direction, the locking hinges are opened away from their cocked spear arm supporting positions allowing the loading spring to pivot the spear arms towards their closed fish engaging position through the plunger and connecting linkage arms. Each over-the-center locking hinge is mounted in a relatively protected position underneath its corresponding spear arm, near the hinged connection of the spear arm to the axial guide member. The locking hinges are thus partially covered and relatively protected between the spear arms and the axial mechanism assembly, and are consequently protected against impact damage or entanglement in vegetation or rock outcroppings.

These and other advantages of the present invention will be better understood by reference to the attached drawings in light of the following detailed description of the preferred embodiment.

BRIEF DESCRIPTION OF THE DRAWINGS

FIG. 3 shows the fish securing device grasping the body of a fish after having been sprung by the fish taking the hook or lure in its mouth.

FIG. 4 is a perspective view of the fish securing device in a closed position.

FIG. 5 is a longitudinal sectional view of the axial spring loading, cocking and trip mechanism with the device in a closed position.

FIG. 6 is a view similar to that in FIG. 5 but with the device shown in a cocked position.

FIG. 7 is a cross-sectional view taken along line 7—7 in FIG. 5.

FIG. 8 is a cross-sectional view taken along line 8—8 in FIG. 5.

FIG. 9 is a cross-sectional view taken along line 9—9 in FIG. 5.

FIG. 10 is a cross-sectional view taken along line 10—10 in FIG. 5.

FIG. 11 is a cross-sectional view taken along line 11—11 in FIG. 5.

FIG. 12 is a cross-sectional view taken along line 12—12 in FIG. 5.

FIG. 13 is a cross-sectional view taken along line 13—13 in FIG. 5.

DETAILED DESCRIPTION OF THE PREFERRED EMBODIMENTS

Figures 1, 2:
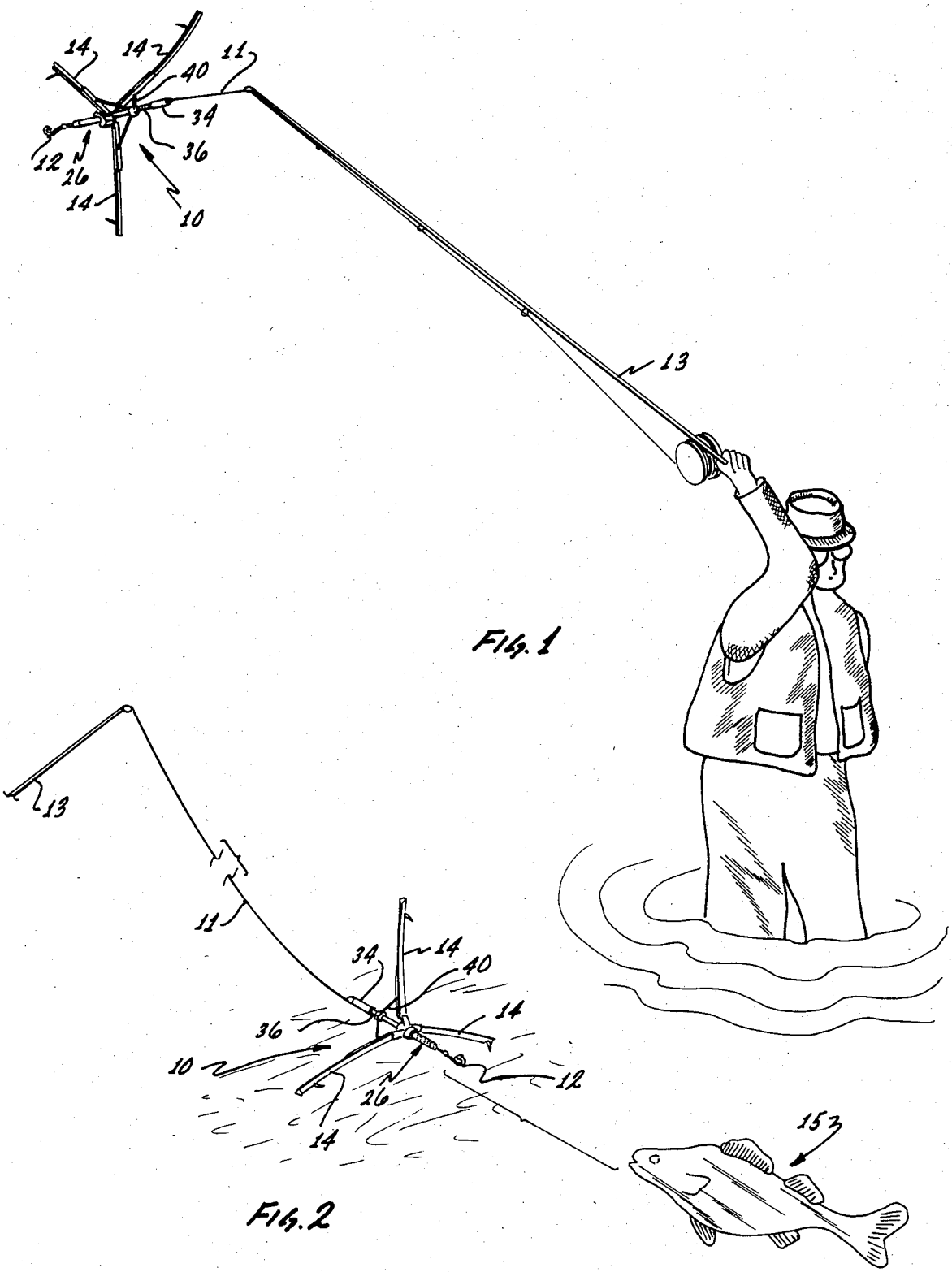
FIG. 1 shows the fish securing device of this invention being cast by means of a conventional rod and reel.
FIG. 2 is a perspective view of the novel fish securing device in cocked position.

With reference to the drawings, FIG. 1 shows the novel fish securing device 10 connected to a fishing line 11 of a casting rod/reel combination 13. The device is cast in the conventional manner and treated essentially as a weight or sinker attached to the fishing line 11. In FIG. 2, the device 10 is shown lying on an underwater bottom in typical position for attracting a fish 15 by means of a baited hook 12 or an artificial lure in lieu of bait. The fish 15 upon nibbling or swallowing the baited hook or lure 12 may be expected to tug or pull on the hook 12 away from the device 10, thereby tripping a spring mechanism, to be described below, thereby closing the three spiked arms 14 which engage and penetrate the body of the fish 15 as shown in FIG. 3, the sharp spikes or ends on each of the three arms 14 spearing and securely holding the body of the fish 15 for retrieval by means of the fishing line 11 and rod/reel 13.

The fish securing device 10 is seen in greater detail in FIG. 4. The device comprises a generally tubular axial spring loading and tripping assembly 16 having a proximal end 18 to which is attached a fishing line such as line 11 in FIGS. 1-3, and a distal end 20 to which attached a fishing hook 12. Three spear arms 14 are hinged at their inner ends 22 to an axial guide member 24, as better appreciated by reference to FIG. 5. Each spear arm hinge is anchored to the axial guide 24 by means of a spacer block 26a. Each arm hinge comprises three hinge strip elements 22a, 22b and 22c. The inner end of the spear arm is affixed to the intermediate hinge strip 22b which is itself hingedly connected to the adjacent proximal strip 22a and distal strip 22c by means of hinge joints 24a and 24b. The hinge strip 22c is also hingedly affixed by hinge joint 24c to the proximal end of the tubular hollow hook carrier element 26. The carrier 26 telescopically receives the distal end 28 of the axial guide member 24 and is axially slideable thereon. In the closed position of the device shown in FIG. 5, the arms 14 rest against abutments 30 fixed on the carrier 26. A spring 32 is mounted coaxially onto the guide member 28 and is held between an end tube 34 fixed to the guide member 24 at the proximal end 18 and a plunger tube 36 telescopically slideable with respect to the end tube 34. The spring 32 urges the tubes 36 and 34 axially apart, thus driving the plunger tube 36 towards the distal end of the axial guide member 24. A connecting ring 38 is affixed to the distal end of the plunger 36 and is axially slideable therewith. Each spear arm 14 is linked to the connecting ring 38 of the plunger 36 by means of a linkage arm 40 pivotably connected at each end 42 to the arm 14 and plunger ring 38 respectively. The linkage arm connection to the arm 14 is spaced from the arm's hinge joint 24a such that axial retraction of the plunger 36 along axial guide 24 compresses the spring 32 and also applies leverage to pivot the spear arms 14 to an open, radially spread apart position seen in FIG. 6 for the single arm shown and also seen in FIGS. 1 and 2.

In the cocked position of FIG. 6, the arms 14 are held in their open radially extended positions against the force of the compressed spring 32 by the over-the-center locking hinges consisting of hinge strips 22b and 22c. In the cocked position, the force of the compressed spring 32 acting through connecting arms 40 and the spear arm 14 tends to urge the hinge 25 over the centerline represented by the vertical dotted line in FIG. 6 to an over-the-center position shown by the dotted line through hinge joint 24b. In the over-the-center position, both hinge strips 22c and 22b are held by spring force in a folded, nearly mutually parallel position against the abutment 30 so as to lock the spear arms 14 against the force of loading spring 32. If however, a fish caught on the hook 12 tugs on the hook carrier 26 in a distal direction, the carrier 26 slides axially on the guide member 24 separating the radially inner ends of the hinge 25, i.e. separating the hinge joints 24c and 24a and as a result moving the hinge out of locking engagement between the pressure of arm 14 and abutment 30. When sufficient separation between the carrier 26 and the spacer blocks 26a is achieved, i.e. when the hinge joint 24c is moved axially past the axial position of the intermediate hinge joint 24b, the locking resistance of the hinge 25 is overcome and the spring force transmitted through lever 40 against arm 14 pivots the hinge strip 22b downwardly about hinge joint 24a, depressing the outer end of the hinge strip 22c and thereby forcing the carrier 26 distally along guide 24. All of the spear arms 14 thus simultaneously pivot from their open cocked position of FIG. 6 to a closed position as in FIGS. 5, 3 and 4, driving their spiked or barbed ends into the body of a fish disposed between the spear arms as shown in FIG. 3.

The sensitivity of the tripping mechanism, i.e. the amount of pulling force required to release the over-the-center hinges 25 is adjustable by means of a set screw 44 threaded axially into the distal end of the guide member 24 for adjustably setting the minimum spacing between the carrier 26 and the distal end of the axial guide member. The trip sensitivity of the device is increased by threading the screw 44 axially out of the guide member 24 thus increasing the spacing between hinge joints 24a and 24c in the cocked condition of FIG. 6. This makes the device more sensitive to pulling force on the carrier 26 for tripping the mechanism to a close position.

The device is easily cocked by grasping the end tube and then pushing the carrier axially to open the spear arms while compressing the loading spring until the hinges 25 latch in their over-the-center positions. The coil spring is fully enclosed and covered in part by the end tube and in part by the plunger tube so as to protect the spring against damage or entanglement with debris which might prevent its smooth operation, to prevent possible injury to the hands of a user, and to form a compact, streamlined tubular axial spring loading, cocking and tripping mechanism.

It will be understood that the configuration of the spear arms may vary from that shown in the drawings. For example, the arms may be large inwardly curved hooks instead or being straight with inwardly directed spikes as shown. Further the arms may advantageously be provided with inwardly oriented sharp cutting or serrated edges extending partly or fully along their length to further secure and grip a fish caught therebetween.

The various hollow elements in the axial assembly are desirably perforated as by radial and axial perforations 48 to admit water into the mechanism so as to prevent the device from becoming buoyant.

The construction of the mechanism is better understood by reference to the cross-sectional views represented in FIGS. 7-13 taken at axially spaced locations as indicated in FIG. 5, the numbers in Figures 7-13 corresponding to like numbered elements in FIGS. 5 and 6.

The preferred embodiment of the invention has been described and illustrated for purposes of clarity and by way of example only. Many changes, substitutions and modifications can be made to the described embodiment by those possessed of ordinary skill in the art without departing from the spirit and scope of the invention which is defined only by the following claims.

What is claimed is:

1. A fish securing device comprising:
    an axial guide member having a proximal end and a distal end;
    a fish hook carrier axially slideable on said axial guide at said distal end thereof;
    a plunger slideable along said axial guide member;
    a plurality of spear arms hingedly mounted to said axial guide intermediate said plunger and said fish hook carrier;
    actuating means connected between said spear arms and said plunger for simultaneously pivoting said spear arms between an open cocked position and a closed fish engaging position responsive to axial movement of said plunger;
    spring means between said plunger and axial guide for urging said spear arms towards their fish engaging closed position,
    over-the-center locking hinge means operatively connecting between said carrier and said axial guide;
    said locking hinge means being engageable for supporting said spear arms in said open position against said spring urging, said locking hinges releasing said spear arms for movement towards their fish engaging closed position in response to distally directed axial tugging force on said carrier.

2. The device of claim 1 further comprising fish hook means attached to said fish hook carrier.

3. The device of claim 2 wherein said hook means is attached to a distal end of said carrier.

4. The device of claim 3 further comprising means for attaching a line to said proximal end of said axial guide member.

5. The device of claim 1 wherein said over-the-center locking hinges are mounted on the distal side of said spear arms.

6. The device of claim 1 wherein each said locking hinge comprises a distal hinge strip, an intermediate hinge strip fixed to a corresponding spear arm and a proximal hinge strip operatively connected to said guide member, said distal strip being hingedly connected to said carrier, said corresponding spear arm being supported in said cocked position while said distal strip is supported in an over-the-center position by an abutment on said carrier, said distal strip being moveable out of said over-the-center position by axial displacement of said carrier in a distal direction thereby to release said spear arms for movement towards their fish engaging closed position.

7. The device of claim 1 wherein each of said spear arms are provided with a corresponding locking hinge, each said locking hinge being disposed between said spear arm and said axial guide member on the distal side of said spear arm so as to be substantially protected against damage.

8. The device of claim 1 wherein said spring means is a coil spring coaxial with said axial guide and mounted proximally of said spear arms.

9. The device of claim 8 wherein said coil spring is fully enclosed in part by an end tube affixed to said axial guide member and in part by said plunger for protection and improved streamlining.

10. A fish securing device comprising:
    an axial guide member having a proximal end and a distal end;
    a fish hook carrier axially slideable on said axial guide at said distal end thereof;
    a plunger slideable along said axial guide member;
    a plurality of spear arms hingedly mounted to said axial guide intermediate said plunger and said fish hook carrier;
    actuating means connected between said spear arms and said plunger for simultaneously pivoting said spear arms between an open cocked position and a closed fish engaging position responsive to axial movement of said plunger;
    spring means between said plunger and axial guide member for urging said spear arms towards their fish engaging closed position; and
    over-the-center locking hinge means operatively connected between said carrier and said axial guide, each said locking hinge comprising a distal hinge strip, an intermediate hinge strip and a proximal hinge strip, said distal strip being hingedly connected to said carrier, said proximal strip being operatively connected to said axial guide member, a corresponding spear arm being affixed to said intermediate hinge strip and supported in said open cocked position against said spring urging while said distal strip is supported in an over-the-center position by said carrier, said distal strip being moveable out of said over-the-center position by axial displacement of said carrier in a distal direction thereby to release said spear arms for movement towards their fish engaging closed position.

11. A fish securing device comprising:
    a generally tubular axial assembly having a distal end and a proximal end, a plurality of spear arms hingedly connected to said axial assembly for movement between an open cocked position an a closed fish engaging position, spring means for urging said spear arms towards said closed position, an over-the-center locking hinge associated with each said spear arm and connected between said spear arm and said axial assembly for releasably supporting the spear arm in said open position while said hinge is in an over-the-center position, and fish hook means connected for releasing said hinges from said over-the-center position thereby to free said spear arms for movement towards said closed position in response to distal tugging on said fish hook means.

* * * * *